United States Patent [19]

Huhta-Koivisto et al.

[11] 4,055,018

[45] Oct. 25, 1977

[54] METHODS AND SYSTEMS RELATING TO UNDULATING MOTION

[76] Inventors: Esko Huhta-Koivisto, Saynavatie 4, 02170 Espoo 17; Pekka Elis Piironen, Gunillankuja 5 D 22, 00840 Helsinki 84, both of Finland

[21] Appl. No.: 630,498

[22] Filed: Nov. 10, 1975

[30] Foreign Application Priority Data

Jan. 28, 1975 Finland .................................. 750225

[51] Int. Cl.² .......................................... A01K 85/00
[52] U.S. Cl. ................................ 43/42.48; 73/194 VS
[58] Field of Search ............................. 43/42.48, 17.1; 73/194 VS

[56] References Cited

U.S. PATENT DOCUMENTS

| | | | |
|---|---|---|---|
| 2,335,322 | 11/1943 | Taylor | 43/42.48 X |
| 2,756,535 | 7/1956 | Dean | 43/42.48 |
| 3,116,639 | 1/1964 | Bird | 73/194 VS |
| 3,225,484 | 12/1965 | Richard | 43/17.1 |
| 3,722,273 | 3/1973 | Yamasaki et al. | 73/194 VS |
| 3,775,670 | 11/1973 | Watanabe | 73/194 VS |

Primary Examiner—Jay N. Eskovitz
Assistant Examiner—Daniel J. Leach
Attorney, Agent, or Firm—Steinberg & Blake

[57] ABSTRACT

Methods and systems are disclosed which make use of undulating motion imparted to a body which is situated in a fluid. The body and the fluid have with respect to the other a relative flow in a given direction, and the configuration of the body in the fluid is such that the body generates Karmán vortices in the fluid, the body being supported in such a way that these vortices result in undulating motion of the body in the fluid. This undulating motion is made use of in a number of different ways.

8 Claims, 8 Drawing Figures

METHODS AND SYSTEMS RELATING TO UNDULATING MOTION

BACKGROUND OF THE INVENTION

The present invention relates to a method and system for achieving undulating motion for a body in a fluid and for making various uses of this undulating motion.

In particular, the present invention relates to methods and systems for utilizing vortices created by a body in a fluid under conditions where there is a relative flow between the body and the fluid.

One of the well known areas where use is made of undulating motion of a body in a fluid is in connection with fishing lures. For example, there are known rocking lures which are constructed in such a way that in order to simulate the swimming movement of fish the body of the lure is given a construction which is intended to induce undulating movement of the lure. However, such lures are constructed in an extremely inefficient manner, primarily on the theory of creating a lack of stability of the lure in the liquid. For example, such lures include a relatively large plate or other obstacle to flow of fluid, generally extending transversely to the direction of flow, and placed at the leading end of the lure where a traction line is connected thereto so that a desired undulating motion can be achieved. However, in practice such an undulating motion is restricted only to a certain part of the lure which moves practically along a straight line.

SUMMARY OF THE INVENTION

It is accordingly a primary object of the present invention to provide methods and systems capable of efficiently achieving an undulating motion for a body in a fluid.

Furthermore, it is an object of the present invention to provide methods and systems capable of utilizing such undulating motion for a number of different purposes such as, for example, for a fishing lure, for obtaining information with respect to a body or a fluid or both, and for generation of energy.

In particular, it is an object of the present invention to provide a highly flexible method and system according to which it is possible with easy convenient variations of the methods and systems to achieve the desired results.

According to the method of the invention for providing a regular undulating motion, a cylindrical body which has a predetermined cylinder axis is situated in a fluid, while there is a relative flow in a given direction between the body in the fluid, with the body having its cylinder axis perpendicular to the direction of relative flow. This body has a configuration capable of producing Karman vortices in the fluid. The body is supported in the fluid for free swinging movement about an axis parallel to the cylinder axis, so that as a result of the creation of the above vortices the body will perform a regular undulating motion.

With the system of the invention for utilizing undulating motion, a body, which is adapted to be placed in the fluid under conditions where the fluid and body have one with respect to the other a predetermined direction of flow, has the form of a cylinder which has a given cylinder axis as well as a given traction axis normal to the cylinder axis and defining therewith a plane of symmetry for the body. A support means is operatively connected with the body to support the latter in the fluid with the traction axis of the body extending in the general direction of relative flow between the body and the fluid and with the cylinder axis extending perpendicularly with respect to this direction of flow. The support means supports the body for free swinging oscillatory movement in the fluid about at least one axis which is parallel to the cylinder axis. This body has opposed ends which respectively lead and trail with respect to the relative direction of flow, and the body has a tapered configuration at its trailing end in a plane perpendicular to the cylinder axis while along the cylinder axis the body has a length which is at least as great as the maximum dimension of the body transversely of the cylinder and traction axes.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
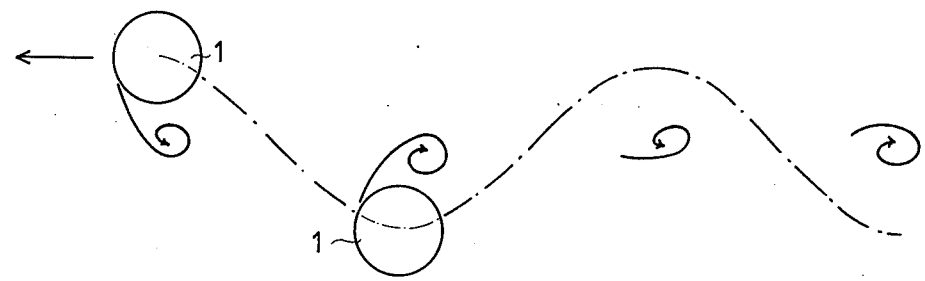
FIG. 1 is a schematic illustration of the principles on which the present invention is based.

The present invention makes use of Karman vortices. Karman vortices are known to be those vortices which are created in a fluid which surrounds and flows with respect to a cylinder which may have, for example, a circular base or another type of cross section, with the cylinder having its axis extending transversely with respect to the flow of the fluid which is, for example, a liquid. Such Karman vortices are formed at predetermined time intervals on both sides of the cylinder and detach themselves from the trailing part of the cylinder while remaining, after detachment, active in the fluid which trails behind the cylinder, these Karman vortices detaching themselves first from one side and then from the other side of the cylinder with a predetermined spacing from one vortex to the next vortex.

It is known that the frequency of detachment of these vortices from a given cylinder, and thus the spacing of the vortices in the fluid, is strictly proportional to the velocity of relative motion between the cylinder and the fluid. In the special case of a body which has the shape of a circular cylinder and which is situated in a flowing fluid, the vortex frequencies conform very accurately to the following formula:

$$f = k\, V/D$$

where $f$ = frequency (number per unit of time) of pairs of vortices $V$ = relative velocity of flow D = diameter of the circular cylinder
k = a constant, approximately 0.2.

Inasmuch as the above formula is valid within a very extensive velocity range, provided that D has been suitably chosen, and inasmuch as the frequency of the vortices is independent of the density of the flowing fluid, of its viscosity, etc., the Kármán phenomenon has heretofore been utilized, for example, in flow rate measurements. For this purpose a cylinder has been placed in the fluid, transversely with respect to the direction of flow thereof, and this cylinder is maintained immovable in directions at right angles to the flow. In connection with such a cylinder a sensing means has been provided to observe and/or count the vortices produced. In this way it has been possible to measure the velocity of flow of the fluid with respect to the cylinder.

However, up to the present time there has been no recognition of the possibility of applying the above Karman phenomenon in technology for the purpose of producing useful movements of the cylinder itself. For example in connection with fishing lures, as referred to above, there has never been any attempt to utilize the Karman phenomenon to induce undulating motion of a fishing lure in order to simulate the swimming motion of fish. The known structural designs of fishing lures for this purpose have remained highly abnormal with respect to efficient utilization of vortices. In fact, it is surprising that the fundamental precondition of a stable vortex trail, namely a symmetrical cylinder body or a trailing surface of suitable shape, has not been utilized in empirically constructed devices. Rather, as pointed out above, such devices have for the most part been rendered unstable in the liquid by utilizing an extensive plate or other obstacle to flow.

According to the present invention the utilization of the vortex phenomenon is based upon a hydrodynamically shaped attack surface and a suitably tapering trailing surface of the vortex-forming body with the body being set in its entirety along a regular undulating path of motion with the result that it is possible to produce a stable, regular vortex trail the shape and configuration of which can be accurately predetermined by simple dimensioning of the device so that it is possible to utilize the vortex phenomenon efficiently toward various practical objectives.

Thus, in accordance with the present invention use is made of devices with respect to which there is a relative flow of a fluid for creating Kármán vortices with the latter being utilized to achieve a useful periodic, undulating motion of the device of the invention or at least of given parts thereof. This motion, which produces a stable, clear-cut and strong vortex trail, has a frequency and amplitude which can be very simply regulated by altering the dimensional proportions of the body. The results of the invention can be achieved at relatively low values of relative flow velocity, while the velocity-frequency relationship is linear within a wide velocity range, so that the invention may be utilized for measuring purposes, for producing mechanical or other energy for various purposes, or for such purposes as providing a fishing lure which will simulate the movements of fish.

Figures 2, 4:
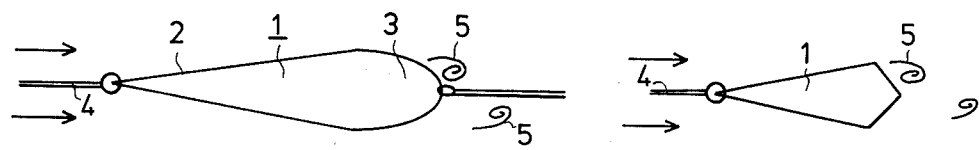
FIG. 2 is a schematic plan view of a fishing lure according to the invention.
FIG. 4 is a schematic plan view of another embodiment of the invention.
Figures 3, 5:
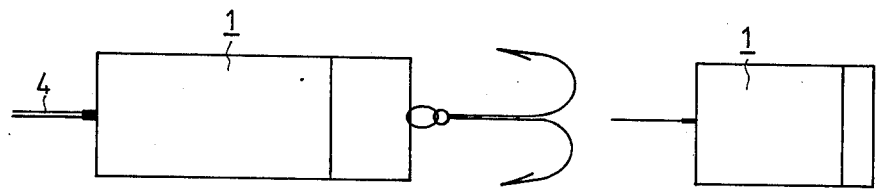
FIG. 3 shows the structure of FIG. 2 in elevation.
FIG. 5 is an elevation of the structure of FIG. 4.

Referring now to the drawings wherein equivalent parts have been designated with identical reference characters, the device which is illustrated in FIGS. 2 and 3 includes a cylindrical body 1 which has in cross section a configuration similar to that of a falling drop of liquid. The plan view of FIG. 2 is in a plane perpendicular to the cylinder axis, so that the cross-sectional configuration of the body is apparent from FIG. 2. The device of FIGS. 2 and 3 is a fishing lure which has a relatively sharp leading end 2 and a tapering but blunter trailing end 3. As is apparent from FIG. 2 the tapering trailing end 3 of the illustrated body 1 has in a plane perpendicular to the cylinder axis substantially the configuration of a semicircle. The cylindrical body 1 may be made of any desired, arbitrarily selected material which is suitable for use in the particular fluid in which the body is placed. It has been found to be advantageous, however, if the specific gravity of the cylindrical body 1 approximately equals the specific gravity of the surrounding fluid.

The length of the cylindrical body 1 along its cylinder axis is apparent from FIG. 3 where this length corresponds to the distance between the top and bottom of the body 1 as viewed in FIG. 3. This length of the body of the invention along its cylinder axis is in FIGS. 2 and 3 of the same general order as the maximum dimension of the body transversely with respect to its cylinder axis, which is to say the maximum width of the body as viewed in FIG. 2. However, the length of the cylindrical body 1 along its cylinder axis may be substantially greater than its maximum width transversely with respect to the cylinder axis.

According to a further feature of the invention the cylindrical body 1 is supported by a support means for free swinging movement in the fluid in which the cylindrical body is located. In the example of FIGS. 2 and 3, this support means takes the form of a fishing line 4 or the equivalent thereof, this line 4 being connected to the center of the leading edge of the body 1. Thus, such a line 4, or the equivalent thereof is attached to the body 1 so as to support the same as well as to serve as a motion-imparting means by pulling the body 1 through a liquid such as water, for instance, the water flowing to the right, as viewed in FIG. 2, with respect to the body 1 which is pulled to the left, as viewed in FIG. 2. The direction of flow of the fluid with respect to the body is indicated by the arrows shown at the left of FIG. 2.

It is to be understood that the cylindrical body 1 is a geometrical body which in any plane perpendicular to the axis of the cylinder will have the cross-sectional configuration illustrated in FIG. 2.

The traction line 4 extends along a traction axis of the body 1 which is perpendicular to the cylinder axis and which with the cylinder axis defines a plane of symmetry for the body 1. In other words, the plane of symmetry for the body 1 will contain the cylinder axis as well as the traction axis, and of course the latter axis extends in a direction of relative flow between the body and the fluid.

Thus, when the cylindrical body 1 of FIGS. 2 and 3 is pulled through the water by applying traction to the line 4, the relative flow between the body and the liquid results in the generation of Kármán vortices 5 which periodically separate themselves from the opposite sides of the body. At the instant when one of these vortices detaches itself from the surface of the body, the vortex directs a lateral force against the trailing end region 3 of the body 1, with the result that the body 1 oscillates, for example, in the plane of FIG. 2. This oscillation takes place about an axis which is parallel to the cylinder axis and which constitutes a natural axis. Such oscillatory or undulating movement is rendered possible by reason of the fact that the point of attachment of the line 4 or the equivalent thereof to the body 1 is capable of yielding laterally. The result is that the cylindrical body 1 progresses through the fluid, such as water, in a manner resembling the movement of a fish.

This phenomenon is demonstrated schematically in FIG. 1 where the body 1 is shown as a simple cylinder of circular cross section. As the cylinder 1 is moved through the fluid to the left, as shown by the arrow in FIG. 1, the Karmán vortices will detach themselves at a periodic frequency first from one side and then from the opposite side of the body, and it will be noted that on one side the vortices rotate in a counterclockwise direction while on the opposite side they rotate in a clockwise direction. Thus, these vortices direct lateral forces against the body to provide it with the undulating path shown by the dot-dash line of FIG. 1, and thus this movement resembles the swimming movement of a fish.

Thus, when it is desired to use the invention for the purpose of a fishing lure, a fishhook is suitably attached to the trailing end 3 of the body 1, as illustrated in FIGS. 2 and 3.

It is not essential that the body 1 of the invention conform precisely to the configuration illustrated in FIGS. 2 and 3. Thus FIGS. 4 and 5 illustrate an embodiment of the invention where the body 1 is composed entirely of exterior flat surfaces. Thus in FIGS. 2 and 3 the trailing end 3 has a cross-sectional configuration, in a plane perpendicular to the cylinder axis, which is substantially that of a semicircle, while in FIGS. 4 and 5 the trailing end of the body 1 has in any plane perpendicular to the cylinder axis the cross section of a triangle. The embodiment of FIGS. 4 and 5 will operate in the same way as the embodiment of FIGS. 2 and 3. Where this embodiment is to be used as a fishing lure a hook will be attached to the trailing end as described above and shown in connection with FIGS. 2 and 3.

Thus, with the embodiment of FIGS. 2 and 3 the body has a cross-sectional configuration similar to a falling drop of liquid whereas in FIGS. 4 and 5 the body has a prismatic cross-sectional configuration.

It is thus apparent that in accordance with the invention the fundamental body for creating Karmán vortices has along its cylinder axis a length equal to or larger than the order of its transverse dimensions, with the trailing end region having a cross-sectional configuration which is for example semicircular or triangular, the important point being that this trailing end region tapers as illustrated in FIGS. 2 and 4. Moreover, in accordance with the invention the support means, formed by the line 4 in the embodiment of FIGS. 2 and 3 as well as in FIGS. 4 and 5, supports the body in the fluid, which has a predetermined direction of relative flow with respect to the body, in such a way that the body is suspended from its holding or traction element 4, thus producing the periodic vortices, created by the body, with the result that the body will oscillate periodically about one or more axes parallel to the cylinder axis while in the above example the body is set along a path of motion which is undulating with reference to the fluid.

Thus, the device of the invention is mainly characterized in that it comprises a fundamental body having a trailing surface of substantially semicircular configuration or triangular configuration with the body having in addition a surface which meets the flowing liquid and which has the configuration of a cylinder which is substantially symmetrical with reference to the plane defined by the fundamental body's traction and cylinder axes, and in its entirety the body has a substantially oval or drop-shaped configuration with the end faces of the body, one of which is visible in FIGS. 2 and 4, being shaped as desired in view of the intended use of the device.

Thus, it is possible, as described above, to produce for the first time a trolling fishing lure the design of which is based upon an understanding of the true nature of the swimming of fish. While the motions of conventional rocking lures are brought about due to powerful flow turbulence cased by the blunt prow or prow plate of such a conventional lure, the lure according to the present invention carries out a smooth and harmonious undulating swimming motion with the water flowing along the sides of the lure and forming regular vortices in the trail left by the trolling lure.

Figure 6:
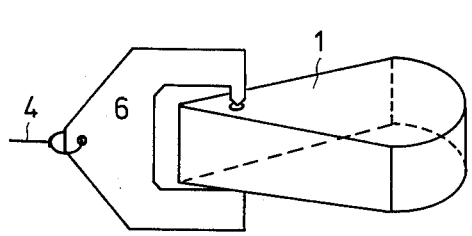
FIG. 6 is a schematic perspective illustration of another embodiment of the invention.

Instead of connecting the flexible line 4 directly to the leading edge of the body 1, it is possible to provide a construction as shown in FIG. 6 where the support means includes a substantially C-shaped member 6 which is connected directly to the line 4 with this member 6 having arms pivotally connected with the top and bottom end surfaces of the body 1, as illustrated in FIG. 6, so as to provide the body 1 with a predetermined pivot axis about which the body 1 is capable of swinging in response to the creation of the vortices as described above. Thus, by providing a support means which includes the pivot member 6, it is possible to determine the location of the axis of oscillation or swinging of the cylindrical body 1, this axis coinciding with the axis which includes the pivot points where the body 1 is connected to the member 6 in the embodiment of FIG. 6.

Of course, in the case where the embodiment of FIG. 6 is to be used as a fishing lure a suitable hook will be attached to the trailing end of the body as described above and shown in FIGS. 2 and 3.

Figure 7:
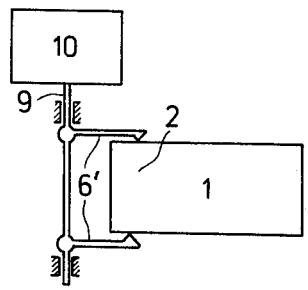
FIG. 7 illustrates schematically an embodiment of the invention for utilizing the undulating motion of a body in a fluid.

In the embodiment of FIG. 7 the support means includes a member 6' which is similar to the member 6 in that it also has pivot points where the support means 6' is directly connected with the body 1 so as to provide a predetermined pivot axis for the latter. However, in the case of FIG. 7, a means is provided to support the support means 6' itself for free swinging movement about the pivot axis provided between the support means 6' and the body 1. Thus it will be seen that the support means 6' includes a shaft 9 which is supported in suitable bearings for oscillatory movement about its axis. In other words, when the support means 6' swings with respect to the pivot axis provided between the support means 6' and the body 1, it will also swing about the axis of the shaft 9. The bearings which support the shaft 9 may be fluid-tight bearings formed at opposed parts of a pipe through which a fluid such as a suitable liquid flows past the body 1 which remains in the pipe at the location illustrated in FIG. 7. Thus, with the embodiment of FIG. 7 while the support means 6' supports the body 1 for undulating motion in response to the creation of the vortices as described above, nevertheless the body 1 will remain at the location illustrated in FIG. 7 while the fluid in the pipe flows to the right, as viewed in FIG. 7, past the body 1.

Therefore, with this embodiment the motion of the leading end 2 of the body 1 will impart an oscillatory movement to the support means 6', causing the shaft 9 to oscillate back and forth around its axis. This movement of the shaft 9 can be sensed by a sensing means 10. It will be seen that this sensing means 10 forms a means for responding to oscillatory movement. The support means 6' and the body 1 form a pair of units to either one of which the sensing means 10, or in other words the means for responding to oscillatory movement, can be connected, and of course in the embodiment of FIG. 7 this means which responds to oscillatory movement is connected to the unit 6' for responding to the oscillatory motion thereof so as to be operated in this way by the oscillatory movement of the shaft 9 about its axis.

The means 10 may be mechanical, acoustic, electrical, magnetic, etc., so as to achieve from the oscillatory angular movement of the shaft 9 a signal which corresponds to these oscillations for providing in this way information with respect to the fluid or with respect to the body 1 or both, although it is also possible to utilize the oscillatory movement of the shaft 9 about its axis for the purpose of generating energy by way the means 10 which is capable of responding to such oscillatory movement.

Figure 8:
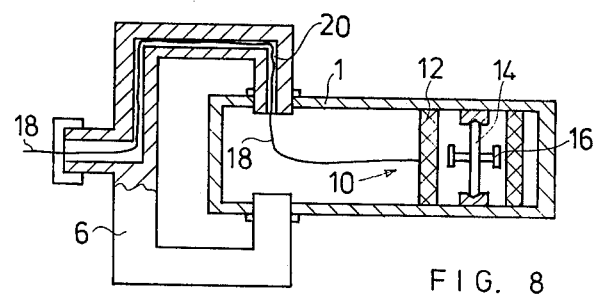
FIG. 8 is a schematic partly sectional illustration of details of a structure for utilizing the undulating motion of a body in a fluid.

Thus, when it is intended to use the device of the invention for the purpose of indicating and/or measuring flow rate or the movement of the body 1, or when it is desired to generate energy, a means corresponding to the sensing means 10 may also be situated within the cylinder 1. Referring to FIG. 8, it will be seen that within the hollow body 1, which may have the same construction as the body 1 shown in FIG. 6, there is a means 10 which includes the coil 12 which is fixedly mounted in the interior of the body 1 and which surrounds a torsion or inertia pendulum 14 in the form of a shaft extending parallel to the cylinder axis and capable of freely swinging about its own axis while carrying, for example, a pair of opposed pole pieces 16 which by their movement with respect to the coil 12 generate electrical signals capable of being transmitted by way of the conductor 18 to any desired location, this conductor 18 together with the coil 12 being situated in a suitable electrical circuit. Thus the conductor 18 corresponds to the line 4 and extends through a bore 20 of the pivot member 6 connected to the body 1 in a manner illustrated in FIG. 8. Thus, in this particular embodiment where the means 10 which responds to oscillatory movement is situated directly within and connected to the body 1, the sensing means 10 is electromagnetic and is capable of producing either a signal or energy conducted from the device of the invention to the place where the signal or energy is to be used by way of a suitably shielded lead 18 which corresponds to the line 4. Of course in this case also instead of pulling the body through the liquid by way of the lead 18 it is possible to mount the member 6 of FIG. 8 in a suitable enclosure so as to swing therein in the same way as the support means 6' of FIG. 7. Of course the sensing means 10 of FIG. 7 may have a construction similar to the sensing means 10 of FIG. 8 in that within the housing of the sensing means there is a coil for responding to the oscillatory movement of the shaft 9 which can carry suitable polepieces which by their movement with respect to the coil generate the desired signal or energy.

It is thus apparent from the above description that those skilled in the art will be capable of utilizing the principles of the present invention in a number of different ways for various purposes.

What is claimed is:

1. In a method for providing a regular undulating motion in a liquid for attracting aquatic creatures therein, the steps of situating a cylindrical body which has a predetermined cylinder axis in the liquid while there is a relative flow in a given direction between the body and the liquid and while positioning the body with its cylinder axis perpendicular to said direction of relative flow with the body having a configuration capable of producing Kármán vortices in the fluid, the body having opposed ends which lead and trail with respect to the direction of relative liquid flow, attaching a line to the leading end of said body for trolling the latter in the liquid and attaching a hook to the trailing end of said body for catching fish attracted by the motion of said body, and supporting the body in the liquid at least in part by way of said line for free swinging movement about an axis parallel to the cylinder axis for providing for the body in the liquid an oscillating motion simulating the swimming of an aquatic creature which swims in an undulating manner.

2. In a system for utilizing undulating motion as a fishing lure, a body adapted to be placed in a liquid under conditions where the liquid and body have one with respect to the other a predetermined direction of flow, said body being a cylinder having a given cylinder axis as well as a given traction axis normal to said cylinder axis and defining therewith a plane of symmetry for said body, and support means formed at least in part by a fishing line and operatively connected with said body for supporting the latter in the liquid with the traction axis of said body extending at least generally in the direction of relative flow between the body and the liquid and with said cylinder axis extending perpendicularly with respect to said direction of flow, and said support means supporting said body for free swinging oscillatory movement in the liquid about at least one axis which is parallel to the cylinder axis, said body having opposed ends which respectively lead and trail with respect to the relative direction of flow and said body having a substantially wedge-shaped configuration at its leading end and a tapered configuration at its trailing end in a plane perpendicular to said cylinder axis while having along said cylinder axis a length at least as great as the maximum dimension of said body transversely of said cylinder and traction axes, and a fishhook connected to said trailing end of said body.

3. The combination of claim 2 and wherein said body has at its trailing end a substantially semi-circular configuration in said plane perpendicular to said cylinder axis.

4. The combination of claim 2 and wherein the body has a substantially triangular configuration in said plane perpendicular to said cylinder axis.

5. The combination of claim 4 and wherein said body is composed entirely of flat outside surfaces.

6. The combination of claim 2 and wherein said support means has said fishing line thereof connected directly to said body at said leading end thereof and extending generally along said traction axis for trolling said body in a liquid.

7. The combination of claim 2 and wherein said support means has in addition to said fishing line a member connected between said fishing line and said body, and said member being operatively connected with said body for pivotally supporting the latter for swinging oscillatory movement about a predetermined pivot axis extending through said body parallel to said cylinder axis.

8. The combination of claim 7 and wherein said fishing line is operatively connected with said member of said support means to provide for said member the capability of swinging freely about said pivot axis with respect to said body.

* * * * *